US008872899B2

(12) United States Patent
Givon

(10) Patent No.: US 8,872,899 B2
(45) Date of Patent: Oct. 28, 2014

(54) METHOD CIRCUIT AND SYSTEM FOR HUMAN TO MACHINE INTERFACING BY HAND GESTURES

(75) Inventor: Dor Givon, Rishon-Lezion (IL)

(73) Assignee: Extreme Reality Ltd., Herzliya (IL)

( * ) Notice: Subject to any disclaimer, the term of this patent is extended or adjusted under 35 U.S.C. 154(b) by 654 days.

(21) Appl. No.: 12/983,335

(22) Filed: Jan. 3, 2011

(65) Prior Publication Data

US 2011/0129124 A1 Jun. 2, 2011

Related U.S. Application Data

(63) Continuation-in-part of application No. 11/572,958, filed as application No. PCT/IL2005/000813 on Jul. 31, 2005, now Pat. No. 8,114,172.

(60) Provisional application No. 60/592,136, filed on Jul. 30, 2004.

(51) Int. Cl.
*H04N 15/00* (2006.01)
*G06K 9/00* (2006.01)
*G06F 3/01* (2006.01)
*G06T 7/00* (2006.01)

(52) U.S. Cl.
CPC ............. *G06F 3/011* (2013.01); *G06T 7/0046* (2013.01); *G06K 9/00389* (2013.01); *G06T 2207/30196* (2013.01)
USPC ............................................ 348/49; 382/154

(58) Field of Classification Search
USPC .......................... 348/49, 77; 345/419; 703/2; 382/115–118, 128, 154, 206
See application file for complete search history.

(56) References Cited

U.S. PATENT DOCUMENTS

| 4,376,950 | A | 3/1983 | Brown et al. |
| 5,130,794 | A | 7/1992 | Ritchey |
| 5,515,183 | A | 5/1996 | Hashimoto |
| 5,691,885 | A | 11/1997 | Ward et al. |
| 5,703,704 | A | 12/1997 | Nakagawa et al. |

(Continued)

FOREIGN PATENT DOCUMENTS

| EP | 1 115254 | 7/2001 |
| JP | 10-040418 | 2/1998 |

(Continued)

OTHER PUBLICATIONS

Prem Karla et al., Real-Time Animation of Realistic Virtual Humans, Sep./Oct. 1998, IEEE Computer Graphics and Applications, pp. 42-56.*

(Continued)

*Primary Examiner* — Gims Philippe
(74) *Attorney, Agent, or Firm* — Vladimir Sherman; Professional Patent Solutions

(57) ABSTRACT

Disclosed are systems, methods and circuits for human to machine interfacing using one or more 3D hand skeleton models, comprising an image acquisition circuit to acquire a 2D image of a hand, a hand feature identifier module to identify hand features in an acquired image and an image skeleton builder module to generate a 2D skeleton dataset of the hand using identified features. A 3D skeleton builder module is adapted to generate a 3D hand skeleton dataset by determining a configuration of some or all of the one or more 3D hand skeleton models whose 2D projection substantially corresponds to the generated 2D skeleton dataset.

15 Claims, 19 Drawing Sheets

(56) References Cited

U.S. PATENT DOCUMENTS

| | | | |
|---|---|---|---|
| 5,745,719 A | 4/1998 | Falcon | |
| 5,831,633 A | 11/1998 | Van Roy | |
| 5,835,133 A | 11/1998 | Moreton et al. | |
| 5,852,450 A | 12/1998 | Thingvold | |
| 5,909,218 A | 6/1999 | Naka et al. | |
| 6,115,482 A | 9/2000 | Sears et al. | |
| 6,243,106 B1 | 6/2001 | Rehg et al. | |
| 6,303,924 B1 | 10/2001 | Adan et al. | |
| 6,317,130 B1 | 11/2001 | Ishikawa et al. | |
| 6,388,670 B2 | 5/2002 | Naka et al. | |
| 6,529,643 B1 | 3/2003 | Loce et al. | |
| 6,545,663 B1 | 4/2003 | Arbter et al. | |
| 6,554,706 B2 | 4/2003 | Kim et al. | |
| 6,597,801 B1 | 7/2003 | Cham et al. | |
| 6,657,670 B1 | 12/2003 | Cheng | |
| 6,674,877 B1 | 1/2004 | Jojic et al. | |
| 6,681,031 B2 | 1/2004 | Cohen et al. | |
| 6,833,843 B2 | 12/2004 | Mojaver et al. | |
| 6,906,687 B2 | 6/2005 | Werner | |
| 7,061,492 B2 | 6/2006 | Carrai et al. | |
| 7,061,532 B2 | 6/2006 | Silverstein | |
| 7,116,330 B2 | 10/2006 | Marshall et al. | |
| 7,123,292 B1 | 10/2006 | Seeger et al. | |
| 7,184,589 B2 | 2/2007 | Okubo | |
| 7,257,237 B1 | 8/2007 | Luck et al. | |
| 7,308,112 B2 | 12/2007 | Fujimura et al. | |
| 7,366,278 B2 | 4/2008 | Fu et al. | |
| 7,397,473 B2 * | 7/2008 | Chakraborty | 345/419 |
| 7,429,997 B2 | 9/2008 | Givon | |
| 7,755,608 B2 | 7/2010 | Chang et al. | |
| 7,783,118 B2 | 8/2010 | Zhou | |
| 7,885,480 B2 | 2/2011 | Bryll et al. | |
| 7,903,141 B1 | 3/2011 | Mariano et al. | |
| 7,936,932 B2 | 5/2011 | Bashyam et al. | |
| 7,978,917 B2 | 7/2011 | Lei et al. | |
| 8,005,263 B2 | 8/2011 | Fujimura et al. | |
| 8,036,494 B2 | 10/2011 | Chen | |
| 8,094,873 B2 | 1/2012 | Kelusky et al. | |
| 8,094,943 B2 | 1/2012 | Eaton et al. | |
| 8,107,726 B2 | 1/2012 | Xu et al. | |
| 8,111,284 B1 | 2/2012 | Givon | |
| 8,114,172 B2 | 2/2012 | Givon | |
| 8,237,775 B2 | 8/2012 | Givon | |
| 8,432,390 B2 | 4/2013 | Givon | |
| 8,462,199 B2 | 6/2013 | Givon | |
| 2001/0007452 A1 | 7/2001 | Naka et al. | |
| 2002/0013683 A1 * | 1/2002 | Toyama et al. | 703/2 |
| 2002/0191239 A1 | 12/2002 | Psaltis et al. | |
| 2003/0007680 A1 | 1/2003 | Iijima et al. | |
| 2004/0155962 A1 | 8/2004 | Marks | |
| 2004/0161133 A1 | 8/2004 | Elazar et al. | |
| 2004/0193413 A1 | 9/2004 | Wilson et al. | |
| 2004/0228530 A1 | 11/2004 | Schwartz | |
| 2005/0023448 A1 | 2/2005 | Ogawara et al. | |
| 2005/0041842 A1 | 2/2005 | Frakes et al. | |
| 2005/0063596 A1 | 3/2005 | Yomdin et al. | |
| 2005/0166163 A1 | 7/2005 | Chang et al. | |
| 2005/0232514 A1 | 10/2005 | Chen | |
| 2005/0259870 A1 | 11/2005 | Kondo et al. | |
| 2005/0271279 A1 | 12/2005 | Fujimura et al. | |
| 2006/0010400 A1 | 1/2006 | Dehlin et al. | |
| 2006/0056679 A1 | 3/2006 | Redert et al. | |
| 2006/0104480 A1 | 5/2006 | Fleisher | |
| 2006/0164230 A1 | 7/2006 | DeWind et al. | |
| 2006/0187305 A1 | 8/2006 | Trivedi et al. | |
| 2006/0294509 A1 | 12/2006 | Mital et al. | |
| 2007/0098250 A1 | 5/2007 | Molgaard et al. | |
| 2007/0183633 A1 | 8/2007 | Hoffmann | |
| 2007/0183663 A1 | 8/2007 | Wang et al. | |
| 2007/0236475 A1 | 10/2007 | Wherry | |
| 2007/0259717 A1 | 11/2007 | Mattice et al. | |
| 2007/0285419 A1 | 12/2007 | Givon | |
| 2007/0285554 A1 | 12/2007 | Givon | |
| 2008/0007533 A1 | 1/2008 | Hotelling | |
| 2008/0013793 A1 | 1/2008 | Hillis et al. | |
| 2008/0030460 A1 | 2/2008 | Hildreth et al. | |
| 2008/0036732 A1 | 2/2008 | Wilson et al. | |
| 2008/0037829 A1 | 2/2008 | Givon | |
| 2008/0037869 A1 | 2/2008 | Zhou | |
| 2008/0101722 A1 | 5/2008 | Bryll et al. | |
| 2008/0104547 A1 | 5/2008 | Morita et al. | |
| 2008/0111710 A1 | 5/2008 | Boillot | |
| 2008/0143975 A1 | 6/2008 | Dennard et al. | |
| 2008/0148149 A1 | 6/2008 | Singh et al. | |
| 2008/0181499 A1 | 7/2008 | Yang et al. | |
| 2009/0058833 A1 | 3/2009 | Newton | |
| 2009/0062696 A1 | 3/2009 | Nathan et al. | |
| 2009/0080715 A1 | 3/2009 | Van Beek et al. | |
| 2009/0116732 A1 | 5/2009 | Zhou et al. | |
| 2009/0141987 A1 | 6/2009 | McGarry et al. | |
| 2010/0066735 A1 | 3/2010 | Givon | |
| 2010/0111370 A1 | 5/2010 | Black et al. | |
| 2010/0141802 A1 | 6/2010 | Knight et al. | |
| 2010/0194862 A1 | 8/2010 | Givon | |
| 2010/0208038 A1 | 8/2010 | Kutliroff et al. | |
| 2010/0303290 A1 | 12/2010 | Mathe | |
| 2010/0328351 A1 | 12/2010 | Tan | |
| 2011/0052068 A1 | 3/2011 | Cobb et al. | |
| 2011/0069152 A1 | 3/2011 | Wang et al. | |
| 2011/0080496 A1 | 4/2011 | Givon | |
| 2011/0129124 A1 | 6/2011 | Givon | |
| 2011/0163948 A1 | 7/2011 | Givon et al. | |
| 2011/0286673 A1 | 11/2011 | Givon et al. | |
| 2011/0292036 A1 | 12/2011 | Sali et al. | |
| 2012/0176414 A1 | 7/2012 | Givon | |
| 2012/0176477 A1 | 7/2012 | Givon | |
| 2012/0218183 A1 | 8/2012 | Givon et al. | |
| 2013/0120319 A1 | 5/2013 | Givon | |

FOREIGN PATENT DOCUMENTS

| | | |
|---|---|---|
| JP | 2001-246161 | 9/2001 |
| JP | 2002-216146 | 8/2002 |
| JP | 2004-062692 | 2/2004 |
| JP | 2006-040271 | 2/2006 |
| JP | 2007-531113 | 1/2007 |
| JP | 2007-302223 | 11/2007 |
| WO | WO 03/025859 | 3/2003 |
| WO | WO 03/039698 | 5/2003 |
| WO | WO 2004/013814 | 2/2004 |
| WO | WO 2004/094943 | 11/2004 |
| WO | WO 2005/114556 | 12/2005 |
| WO | WO 2006/011153 | 2/2006 |
| WO | WO 2006/099597 | 9/2006 |
| WO | WO 2008/126069 | 10/2008 |
| WO | WO 2011/033519 | 3/2011 |
| WO | WO 2013/069023 | 5/2013 |

OTHER PUBLICATIONS

Pavlovic et al., Visual Interpretation of Hand Gestures for Humans-COmputer Interaction : A review, Jul. 1997, IEEE Transaction on Pattern Analysis and Machine Intelligence, vol. 19, No. 7, Jul. 1997.*
Carranza et al., "Free-Viewpoint Video of 1-39 Human Actors", Proc. of ACM Siggraph 2003, Jul. 27, 2003.
Cheung G K M et al.,"Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.
Starck et al., "Model-based multiple view reconstruction of people", Proceedings of the Eight IEEE International Conference on Computer Vision. (ICCV). Nice, France, Oct. 13-16, 2003.
Molet T et al: "An animation interface designed for motion capture", Computer Animation '97 Geneva, Switzerland Jun. 5-6, 1997.
Kronrod B et al., "Optimized triangle mesh compression using prediction trees", Computer Graphics and Applications, 2000. Proceedings. the Eighth Pacific Conference on Hong Kong, China Oct. 3-5, 2000.
Theobalt C et al.,: "Enhancing silhouette-based human motion capture with 3D motion fields", Computer Graphics and Applications,

(56) References Cited

OTHER PUBLICATIONS

2003. Proceedings. 11th Pacific Conference on Oct. 8-10, 2003, Piscataway, NJ, USA, IEEE, Oct. 8, 2003.

Bregler C et al: "Tracking people with twists and exponential maps", Computer Vision and Pattern Recognition, 1998. Proceedings. 1998 IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.

Sminchisescu et al. "Estimated Articulated Human Motion with Covariance Scaled Sampling". Published 2003.

Sappa et al. "Monocular 3D Human Body Reconstruction toward Depth Augmentation of Television Sequences". Published 2003.

Sminchisescu et al. "Human Pose Estimation from Silhouettes A Consistent Approach Using Distance Level Set". Published 2002.

Sminchisescu C et al: "Kinematic jump processes for monocular 3D human tracking", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A, vol. 1, Jun. 18, 2003, pp. 69-76, XP010644883, DOI: 10.1109/CVPR.2003.1211339 ISBN: 978-0-7695-1900-5.

Ren Ng, "Digital Light Field Photography", Jul. 2006, (available at www.lytro.com/rennig-thesis.pdf).

D'Apuzzo N et al: "Modeling human bodies from video sequences", SPIE Proceedings, The International Society for Optical Engineering—SPIE, Bellingham, Washington, USA, vol. 3641, Jan. 1, 1998, pp. 36-47, XP002597223, ISSN: 0277-786X, DOI: 10.1117/12.333796.

\* cited by examiner

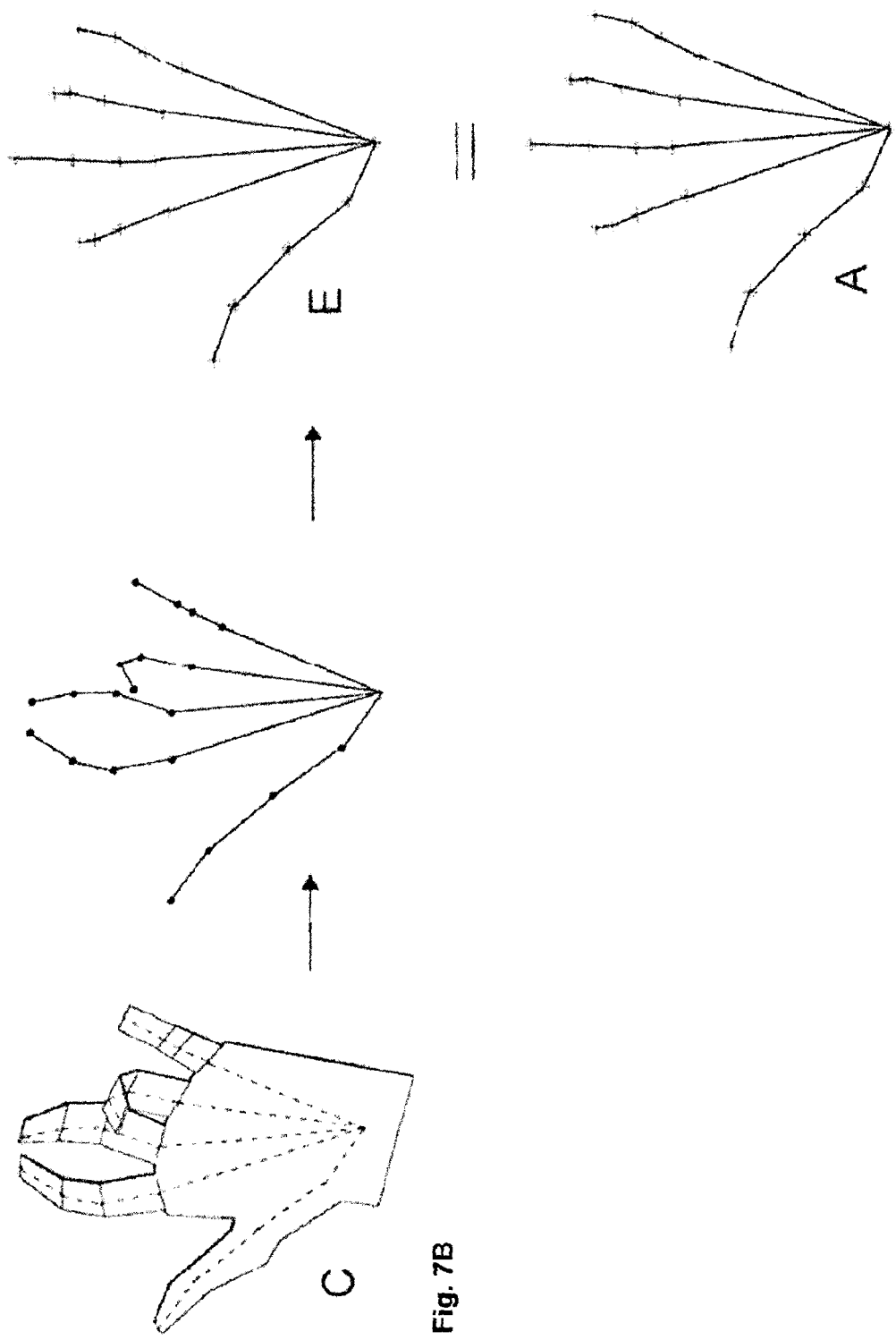

METHOD CIRCUIT AND SYSTEM FOR HUMAN TO MACHINE INTERFACING BY HAND GESTURES

CROSS-REFERENCE TO RELATED APPLICATIONS

This application is a CIP of U.S. patent application Ser. No. 11/572,958 filed Jan. 30, 2007 by the inventor of the present application, which is a National Phase Application of PCT/IL2005/000813, which in turn claims priority from provisional patent application U.S. 60/592,136 all of which are hereby incorporated by reference in their entirety.

FIELD OF THE INVENTION

The present invention relates generally to the field of human to machine interfacing and touchless human to machine interfacing. More specifically, the present invention relates to machine commanding using hand gestures performed in front of a camera.

BACKGROUND

Traditional human to machine interfacing makes use of several core interfacing technologies. The first, and most common, are physical interfacing units such as buttons, knobs, switches and so forth, which are designed to be pressed, held, turned, moved, switched or otherwise manipulated by an interfacing human, in order to elicit a corresponding response of the interfaced machine.

A second base technology is the use of touch screens, where physical interfacing units are substituted by graphic images displayed on a screen and interfaced by the user touching or sliding his finger/organ on the area of the graphic image corresponding to the command he wishes to give to the interfaced machine. As graphical images may be altered, flexible interfaces corresponding to various types of uses or applications may be used to optimize user experience and interfacing efficiency.

Other methods make use of technologies such as: human voice recognition, used to identify natural language commands spoken by a user; and of devices which are held or attached to a user, which devices' movements may be tracked and correlated to machine commands.

There still remains a need, in the field of human to machine interfacing, for touch-less interfacing methods and systems, that may enable one or more optical images of natural human body or body part(s)/organ(s) (e.g. a human hand) to be translated into machine commands corresponding to specific movements and/or gestures performed by said human parts/organ(s).

SUMMARY OF THE INVENTION

The present invention includes methods, circuits, and systems for human to machine interfacing by hand gestures, enabling touchless human to machine interfacing. According to some embodiments of the present invention, interfacing with the machine may be done by performing hand gestures in front of a camera.

According to some embodiments of the present invention, a camera may be attached to image processing logic adapted to identify the hand gestures. According to some embodiments of the present invention, the image processing logic may extract hand features and/or elements such as creases, phalanges, and fingertips from the hand image.

According to some embodiments of the present invention, the image processing logic may create a 2D image skeleton based on the hand features and/or elements that were identified. According to some embodiments of the present invention, the image processing logic may create a 3D skeleton, a 2D projection of which may be substantially similar to the 2D image skeleton and which may meet a set of constraints. According to some embodiments of the present invention, the set of constraints may define a realistic hand pose.

According to some embodiments of the present invention the 3D skeleton may represent the interfacing hand's pose and/or location and/or distance from the camera. According to some embodiments of the present invention, the image processing logic may trigger a system event according to the gesturing hand's (represented by the 3D skeleton) pose and/or location and/or distance from the camera. According to some embodiments of the present invention, the image processing logic may interpret the 3D skeleton motion into commands sent to a machine the hand is interfacing with.

According to some embodiments of the present invention, systems for human to machine interfacing may use one or more 3D hand skeleton models. The systems may comprise an image acquisition circuit for acquiring a 2D image of a hand, a hand feature identifier module for identifying hand features in an acquired image, an image skeleton builder module for generating a 2D skeleton dataset of the hand using identified features and/or a 3D skeleton builder module for generating a 3D hand skeleton dataset by determining a configuration of some or all of said one or more 3D hand skeleton models whose 2D projections substantially correspond to the generated 2D skeleton dataset.

According to some embodiments of the present invention, the image skeleton builder module may be further adapted to use anatomic relationships and constrains between a human hand's elements to generate the 3D skeleton dataset.

According to some embodiments of the present invention, the image skeleton builder module may be further adapted to determine a quality attribute for one or more of the 2D skeleton dataset elements.

According to some embodiments of the present invention, human to machine interfacing systems may comprise a skeleton database builder module for storing one or more previous 3D hand skeleton datasets, and the 3D skeleton builder may be adapted for generating the 3D hand skeleton dataset at least partially based on one or more 3D hand skeleton datasets previously stored by the database builder module.

According to some embodiments of the present invention, human to machine interfacing systems may comprise a prediction module for predicting a 3D hand skeleton dataset based on two or more preceding 3D hand skeleton datasets to which motion dynamics physics rules are applied, and the 3D skeleton builder is further adapted for generating the 3D hand skeleton dataset at least partially based on the 3D hand skeleton dataset as predicted by the prediction module.

According to some embodiments of the present invention, methods for human to machine interfacing using one or more 3D hand skeleton models may include: acquiring a 2D image of a hand, identifying one or more hand features in an acquired image, generating a 2D skeleton dataset of the hand using identified features; and/or generating a 3D hand skeleton dataset by determining a configuration of some or all of said one or more 3D hand skeleton models whose 2D projection substantially corresponds to the generated 2D skeleton dataset.

According to some embodiments of the present invention, the human to machine interfacing method may further include generating the 3D skeleton dataset at least partially based on anatomic relationships and constrains between a human hand's elements.

According to some embodiments of the present invention, human to machine interfacing methods may include generating the 2D skeleton dataset at least partially based on the determination of a quality attribute for one or more of the 2D skeleton dataset elements.

According to some embodiments of the present invention, human to machine interfacing methods may include generating the 3D hand skeleton dataset at least partially based on: storing one or more 3D hand skeleton datasets, and generating the 3D hand skeleton dataset at least partially based on the previously stored 3D hand skeleton datasets.

According to some embodiments of the present invention, human to machine interfacing methods may include generating the 3D hand skeleton dataset at least partially based on: predicting a 3D hand skeleton dataset by applying motion dynamics physics rules to two or more previously generated 3D hand skeleton datasets and generating the 3D hand skeleton dataset at least partially based on the predicted 3D hand skeleton dataset.

According to some embodiments of the present invention, circuits for generating a 3D hand skeleton dataset by using one or more 3D hand skeleton models, may include: a hand feature identifier module for identifying hand features in a 2D image of a hand, an image skeleton builder module for generating a 2D skeleton dataset of the hand using identified features, and/or a 3D skeleton builder for determining a configuration of the one or more 3D hand skeleton models whose 2D projection substantially corresponds to the generated 2D skeleton dataset.

According to some embodiments of the present invention, the image skeleton builder module of circuits for generating a 3D hand skeleton dataset may use anatomic relationships and constraints between a human hand's elements to generate the 3D skeleton dataset.

According to some embodiments of the present invention, the image skeleton builder module may determine a quality attribute for one or more of the 2D skeleton dataset elements.

According to some embodiments of the present invention, circuits for generating a 3D hand skeleton dataset may include a skeleton database builder module for storing one or more previous 3D hand skeleton datasets and for generating the 3D hand skeleton dataset at least partially based on one or more 3D hand skeleton datasets previously stored by the database builder module.

According to some embodiments of the present invention, circuits for generating a 3D hand skeleton dataset may include a prediction module for predicting a 3D hand skeleton dataset based on two or more preceding 3D hand skeleton datasets to which motion dynamics physics rules are applied, and the 3D skeleton builder is adapted to generate the 3D hand skeleton dataset at least partially based on the 3D hand skeleton dataset as predicted by said prediction module.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7A through 7C show several exemplary 2D image skeletons in different poses and substantially similar projections of 3D skeletons, in accordance with some embodiments of the present invention;

Figure 1:
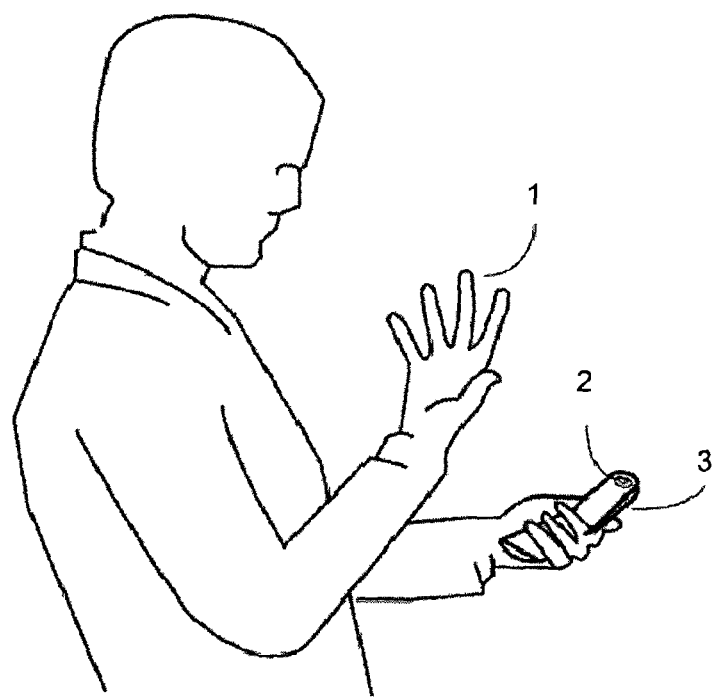
FIG. 1 is an illustration of a hand being imaged by a camera of a communication/computing device, which communication/computing device may include processing logic adapted to identify a gesture being made by the hand and, optionally, to generate a command or an event based on the identified hand pose and/or gesture, all in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods circuits and systems for hand gesture and/or body touchless human to machine interfacing. The concepts and methods described in this application are explained with regard to hand gestures in order to keep the description simple, the same concepts and methods may be applied to full body motion detection and/or motion detection of other body parts.

According to some embodiments of the present invention the state of a hand or a human body may be determined. According to some embodiments of the present invention, the state may include the hand/body distance from the camera, its spatial orientation, and/or its pose. According to some embodiments of the present invention, there may be provided image processing logic for extracting a 3D skeleton which may represent a pose and/or orientation and/or distance from the camera, of a hand, a body, or parts of a body. According to some embodiments of the present invention, there may be provided a method for extracting a 3D skeleton which may represent a pose and/or orientation and/or distance from the camera, of a hand, a body, or parts of a body. According to some embodiments of the present invention, there may be provided a method for identifying a skeleton of a human body or part of a human body, and identifying a 3D skeleton of a hand within the human body.

According to some embodiments of the present invention, there may be provided a camera, in front of which there may be a subject such as a hand of a human which may be interfacing with a machine. According to some embodiments of the present invention, the hand in front of the camera may interface with the machine by performing hand gestures. According to some embodiments of the present invention, the camera may capture one or a series of images of the interfacing hand. According to some embodiments of the present invention, the camera may be connected to image processing logic adapted to estimate a spatial position of one or more features, elements, phalanges, and/or joints within an image of an interfaced subject such as a user's hand intentionally interfacing with a machine.

According to some embodiments of the present invention, the image processing logic may create a 3D skeleton which may be a skeletal representation of the interfacing hand. According to some embodiments of the present invention, the proportions of the dimensions of the elements of the 3D skeleton may be substantially similar to the proportions of the dimensions of the elements of the interfacing hand. According to some embodiments of the present invention, the dimensions of elements or features of the 3D skeleton may be proportional to a length of one unit. According to some embodiments of the present invention, the image processing logic may create a 2D image skeleton according to features and/or elements identified in the interfacing hand's image.

According to some embodiments of the present invention, the image processing logic may create optional 3D positions of the 3D skeleton and may apply a set of constraints to the 3D skeleton in order to substantially match a 2D projection of it to the 2D image skeleton.

According to some embodiments of the present invention, motion dynamics physics rules may also be applied to two or more 3D skeletons in order to generate a prediction of the next frame of the 3D position of the 3D skeleton.

Figure 2A:
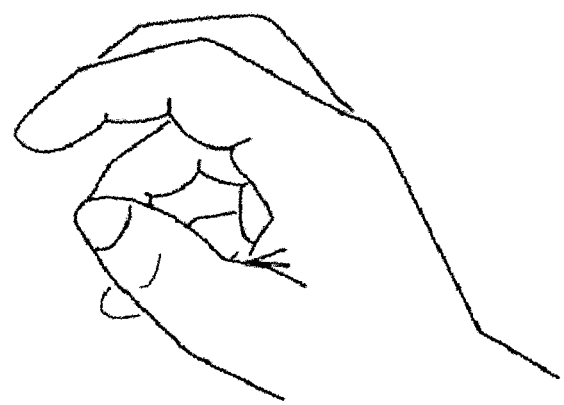
FIGS. 2A through 2I are image illustrations of a hand doing exemplary gestures that may be recognized by a camera and correlated to commands and/or events of a computing device, all in accordance with some embodiments of the present invention.
Figure 2B:
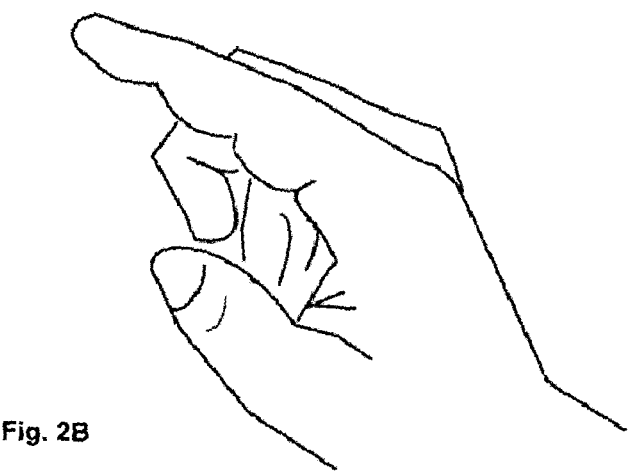
Figure 2C:
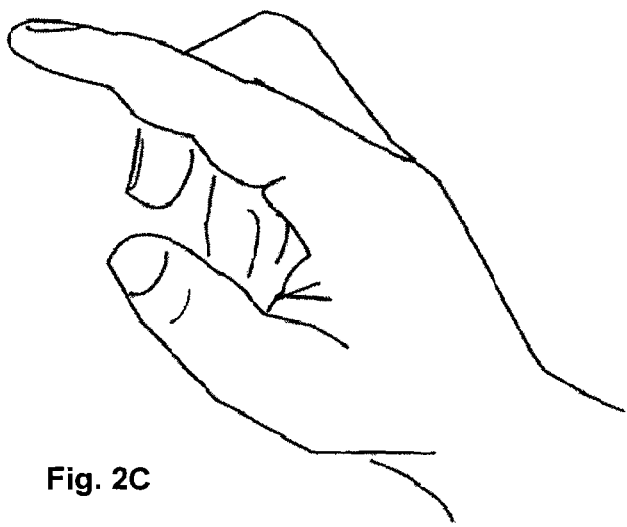
Figure 2D:
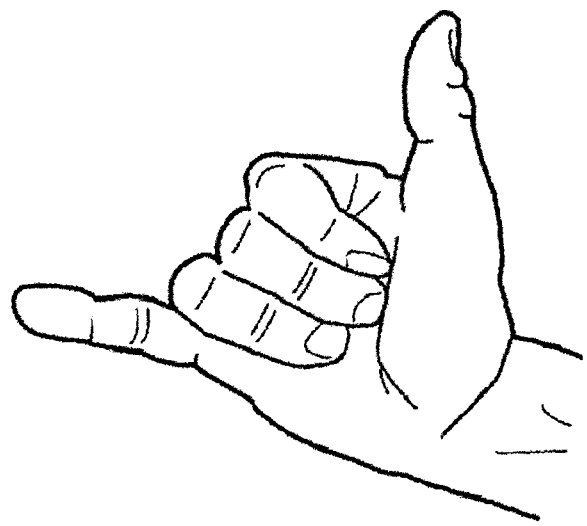
Figure 2E:
Figure 2F:
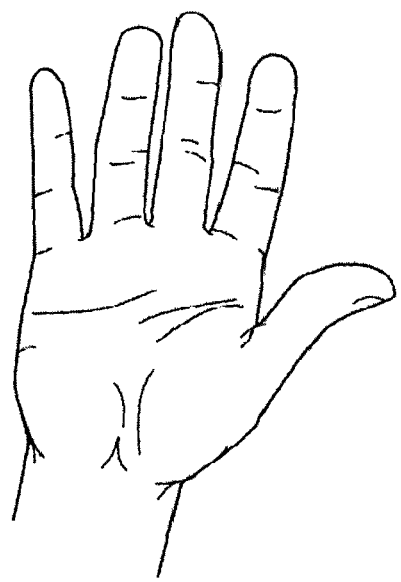
Figure 2G:
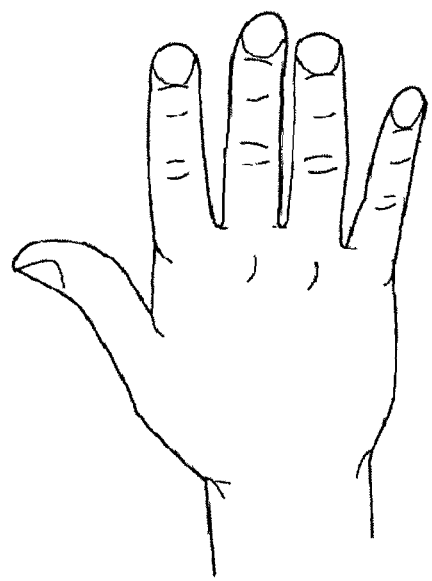
Figure 2H:
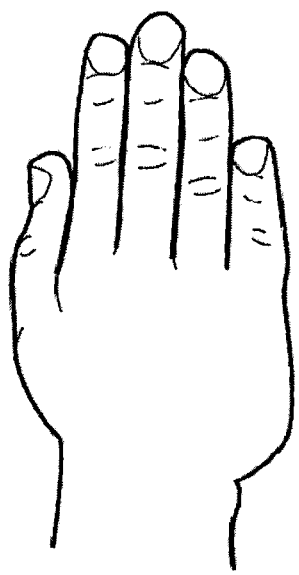
Figure 2I:
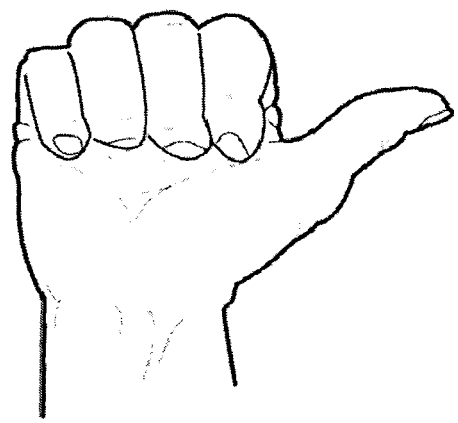

FIG. 1 is an exemplary schematic description of the system in accordance with the present invention. According to this example there may be an interfacing hand (1) doing hand gestures in front of a camera (2) which is placed in a cellphone (3). FIGS. 2A trough 2F show exemplary images of an interfacing hand in different poses.

According to some embodiments of the present invention, the image processing logic may detect features of the interfacing hand such as fingers, finger tips, fingernails, finger creases, palm creases, finger joints as well as other features.

Figure 3:
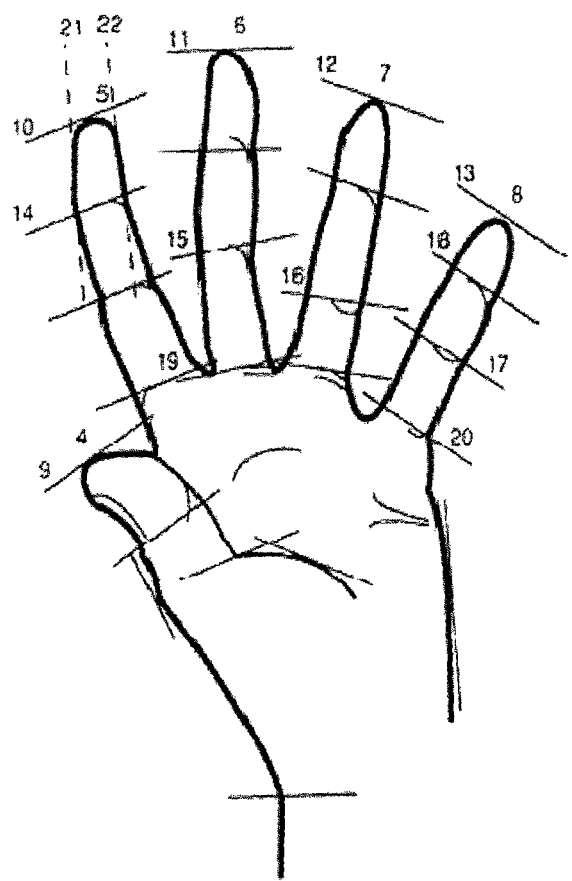
FIG. 3 shows exemplary features of the illustrated hands shown in FIGS. 2A through 2I, which features may be extracted from the hands' image by the image processing logic included in the communication/computing device, all in accordance with some embodiments of the present invention.

FIG. 3 shows exemplary features of the exemplary interfacing hand shown in FIGS. 2A through 2F. In this FIGS. 4, 5, 6, 7 and 8 may represent the thumb, the index finger, the middle finger, the ring finger and the little finger respectively. Accordingly 9, 10, 11, 12 and 13 may represent the finger tips of the thumb, the index finger, the middle finger, the ring finger and the little finger respectively. 14, 15, 16, 17 and 18 may represent the creases in the fingers. 19 and 20 may represent creases of where the index finger and the little finger are connected to the palm. 21, 22 may represent lines which are tangential to a phalanx of the index finger.

According to some embodiments of the present invention, the image processing logic may include a memory. According to some embodiments of the present invention, the image processing logic may store a general structure of a hand skeleton in memory. According to some embodiments of the present invention, the image processing logic may store a general structure of a human body skeleton in memory.

According to some embodiments of the present invention, the general structure of the 3D hand skeleton stored in memory may be described as a vector, in which some primitives of the vector describe the parameters of the bones in the hand (such as length) and some primitives of the vector describe the parameters of the joints, which describe the dynamic relationships (such as angels) between the bone primitives.

Figure 4:
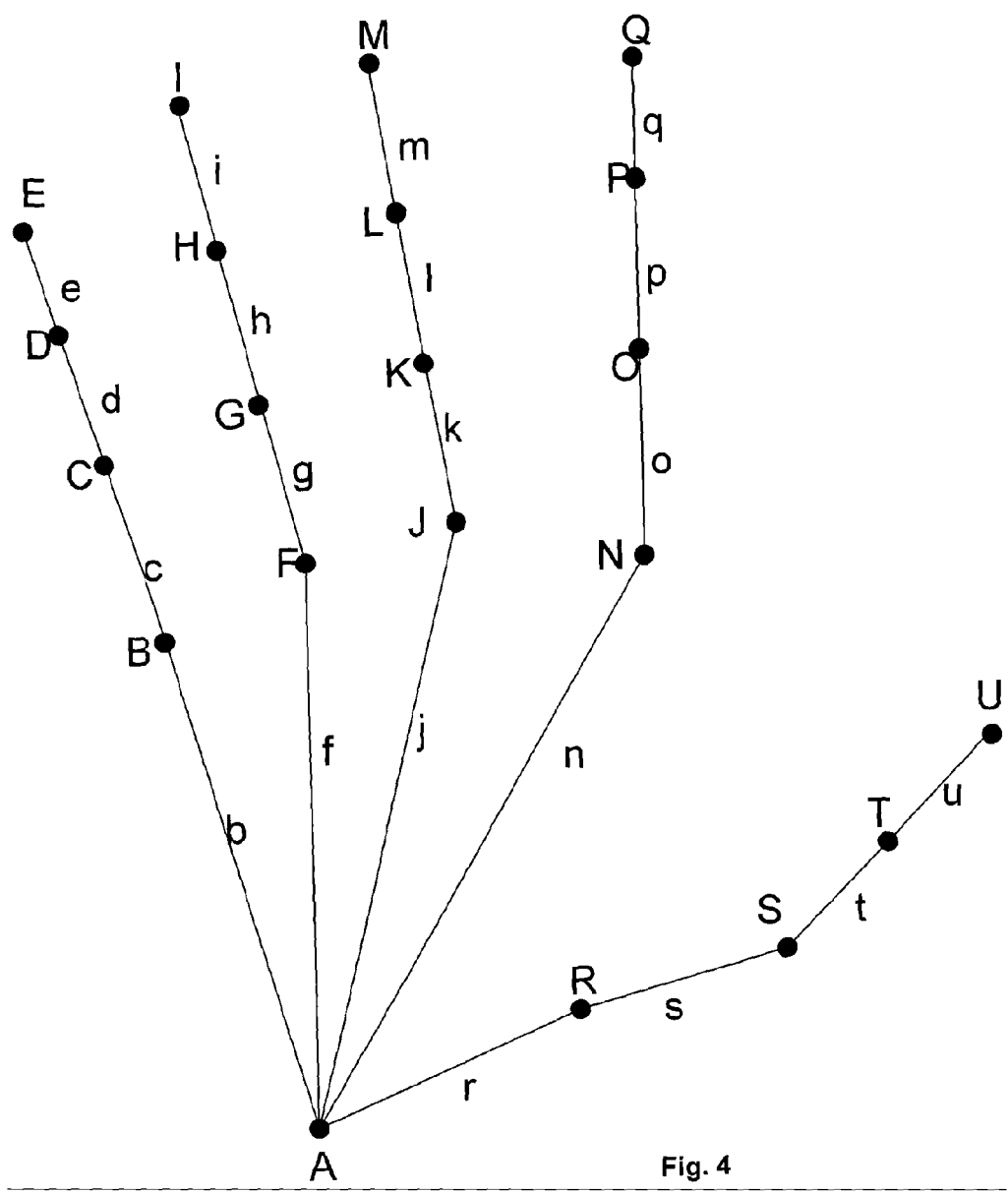
FIG. 4 shows an exemplary structure of a hand skeleton, in accordance with some embodiments of the present invention.

FIG. 4 shows an example of a general structure of a hand skeleton according to some embodiments of the present invention. According to this example, the hand skeleton is constructed from joints/tips A, B, C . . . U connected by bones b, c, d, e . . . u.

As the dimensions of a person's hand are within certain limits, with a young child's hand being the smallest and a big, grownup person's hand being the largest, and since the hand interfacing with the machine may be at different distances from the camera in a way such that when the hand is close to the camera the hand's image may be large, and when the hand is further away from the camera the hand's image may be small. Accordingly, the image of the interfacing hand may be of different sizes depending on the person's age and the distance of the hand from the camera, however, the proportions of the dimensions of different features and/or elements in a given interfacing hand remain constant regardless of the hand distance from the camera or its orientation. Therefore, given a length of a first feature and/or element in a hand, the lengths of all other features and/or elements of the hand may be defined in relation to the first feature and/or element. For example, bone b in FIG. 4 may be defined as the first element, the length of bone c may be k1*length(b), the length of bone d may be k2*length(b) and so on.

According to some embodiments of the present invention, the interfacing hand may be modeled by a general structure 3D skeleton stored in memory. According to some embodiments of the present invention, the length of a certain designated bone representing a hand object (such as the length of the bones of the Index finger from the palm joint to the finger tip, the length of a specific bone, or the accumulation of the lengths of several bones) of the 3D skeleton may be defined as a one unit length. According to some embodiments of the present invention, the lengths of the bones/hand-objects of a 3D skeleton may be defined in proportion to the designated bone/hand-object.

According to some embodiments of the present invention, the image processing logic may estimate from the hand's image, the relative lengths of the bones. According to some embodiments of the present invention, the image processing logic may estimate the bones lengths and/or the distance of the hand from the camera. Due to various factors in the image, such as hand orientation and pose, hidden hand elements, etc., the certainty level of some estimated lengths may be smaller than the certainty level of elements' lengths that appear clearly in the image.

According to some embodiments of the present invention, the 3D skeleton vector may have a set of attributes associated with each bone, and stored in memory. According to some embodiments of the present invention, the bone attributes may include the bone's relative length. According to some embodiments of the present invention, the bone attributes may include the length quality. According to some embodiments of the present invention, the bone attributes may include the quality robustness/certainty. According to some embodiments of the present invention, the bone attributes may include angle dependencies relative to other bones. According to some embodiments of the present invention, angle dependencies may be hierarchical.

According to some embodiments of the present invention, the image processing logic may also store an image skeleton which may be a two dimensional (2D) general structure of a hand skeleton in memory. According to some embodiments of the present invention, the 2D image skeleton stored in memory may be described as a vector constructed from primitives representing the hand bones and joints. According to some embodiments of the present invention, the vector joint primitives may be described as points on a plane, each having a set of two dimensional coordinates (x,y). According to some embodiments of the present invention, the vector primitives may include an attribute representing the primitive (joint) connection (bone) to other vector primitives (joints). According to some embodiments of the present invention, the image 2D skeleton vector may have a set of 2D (x,y) coordinates associated with each primitive, and stored in memory. According to some embodiments of the present invention, the primitive (x,y) coordinates may be extracted from the hand image.

According to some embodiments of the present invention, the image processing logic may estimate the two dimensional location of the joints, the fingertips and the phalanges of the hand in the captured image. According to some embodiments of the present invention, the location of the joints, the fingertips and the phalanges may be estimated by analyzing the detected hand features. According to some embodiments of the present invention, the location of the joints may be estimated according to the location of the creases in the fingers. According to some embodiments of the present invention, the location of the joints may be estimated according to the location of the intersection of two lines which are tangent to two segments of a finger. According to some embodiments of the present invention, the location of a phalanx may be estimated by connecting two adjacent joints with a straight line. According to some embodiments of the present invention the location of a phalanx may be estimated by connecting a fingertip and an adjacent joint with a straight line. According to some embodiments of the present invention, the location of a phalanx may be estimated by identifying the phalanx in the image. According to some embodiments of the present invention, the location of a phalanx may be estimated by identifying portions of the phalanx in the image and interpolating and/or extrapolating the rest of the phalanx.

Figure 5A:
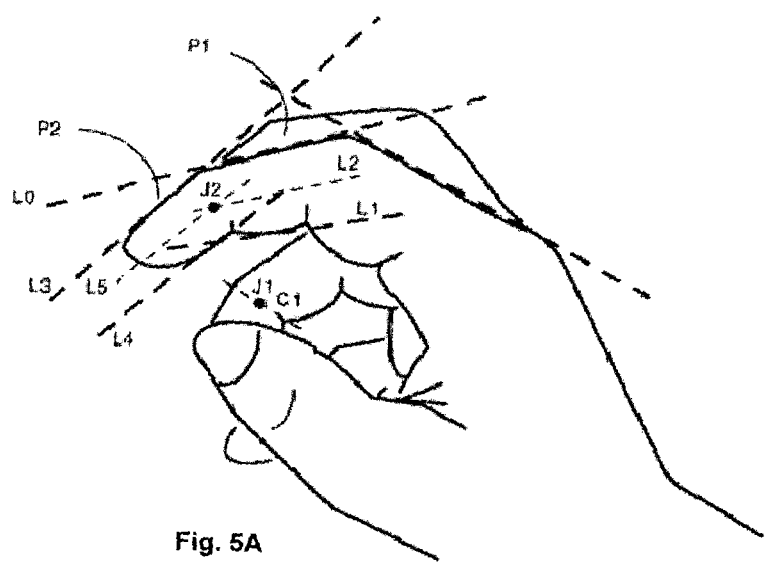
FIGS. 5A through 5C, show exemplary manners of extracting hand elements' positions from visible and invisible hand features, in accordance with some embodiments of the present invention.
Figure 5B:
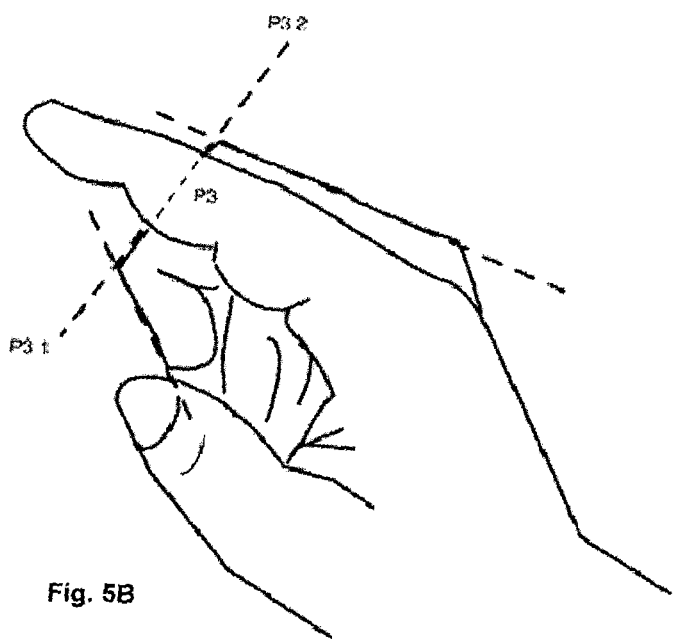
Figure 5C:
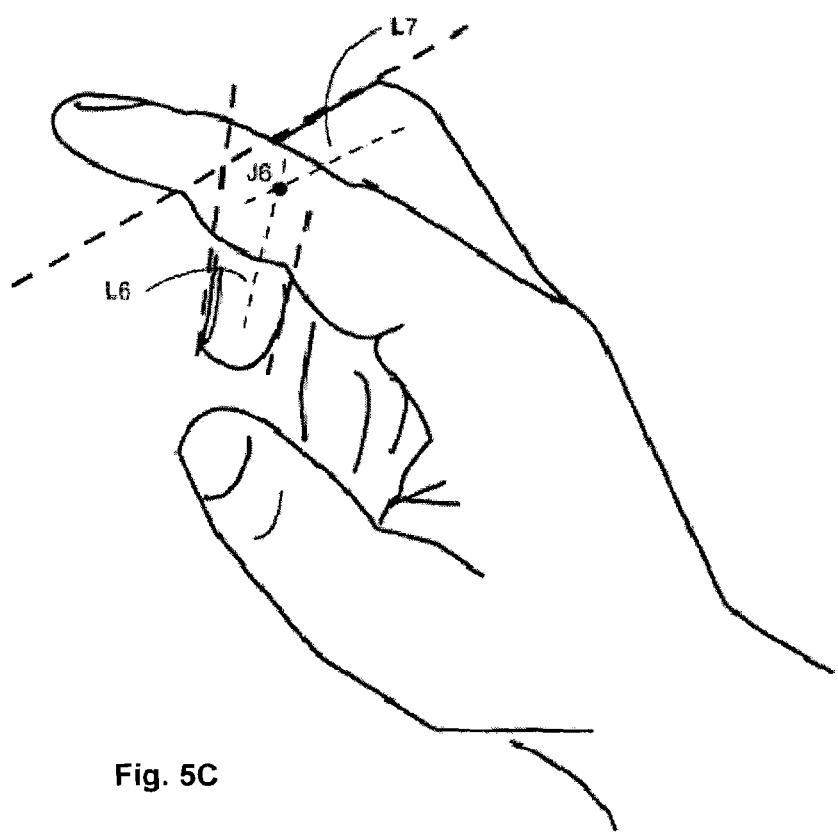
Figure 6A:
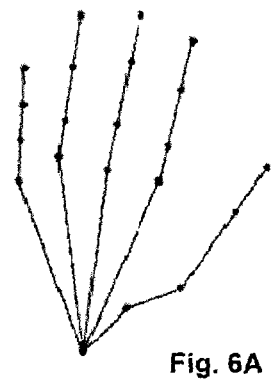
FIGS. 6A through 6D show several examples of a 2D image skeleton extracted from an interfacing hand, in accordance with some embodiments of the present invention.
Figure 6B:
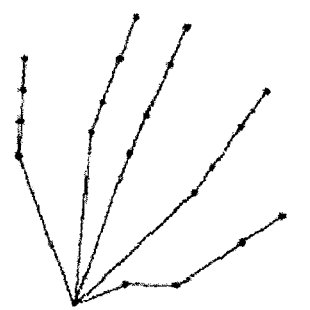
Figure 6C:
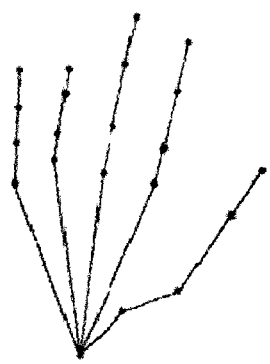
Figure 6D:
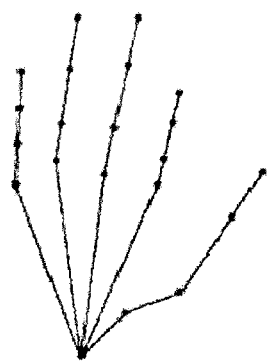

FIGS. 5A, through 5C show some examples of an image of a hand. According to the example in FIG. 5A, the location of joint J1 may be estimated according to crease C1. Lines L0 and L1 may be tangential to phalanx P1, line L2 may be the center between lines L0 and L1 and may represent the center of phalanx P1. Lines L3 and L4 may be tangential to phalanx P2, line L5 may be the center between lines L3 and L4 and may represent the center of phalanx P2. The location of joint J2 may be estimated according to the intersection of line L2 and line L5. In FIG. 5C, the location of joint J6, although not visible in the image since it is hidden behind the index finger, may be estimated according to the intersection of line L6 and line L7. In FIG. 5B, the location of phalanx P3 may be estimated by interpolating segments P3.1 P3.2.

According to some embodiments of the present invention, the location of invisible hand elements (phalanges and joints) may be estimated according to visible hand elements and the hierarchical relationship between the visible and invisible elements.

According to some embodiments of the present invention, the image processing logic may assign the estimated two dimensional locations of the joints and fingertips to the corresponding primitives of the 2D image skeleton vector. Since the 2D locations of some joints may be estimated more accurately and the location of other joints may be estimated less accurately, according to some embodiments of the present invention, the primitive coordinates may include primitive location quality attributes. FIGS. 6A through 6D are several examples of an image skeleton extracted from an interfacing hand.

Figure 7A:
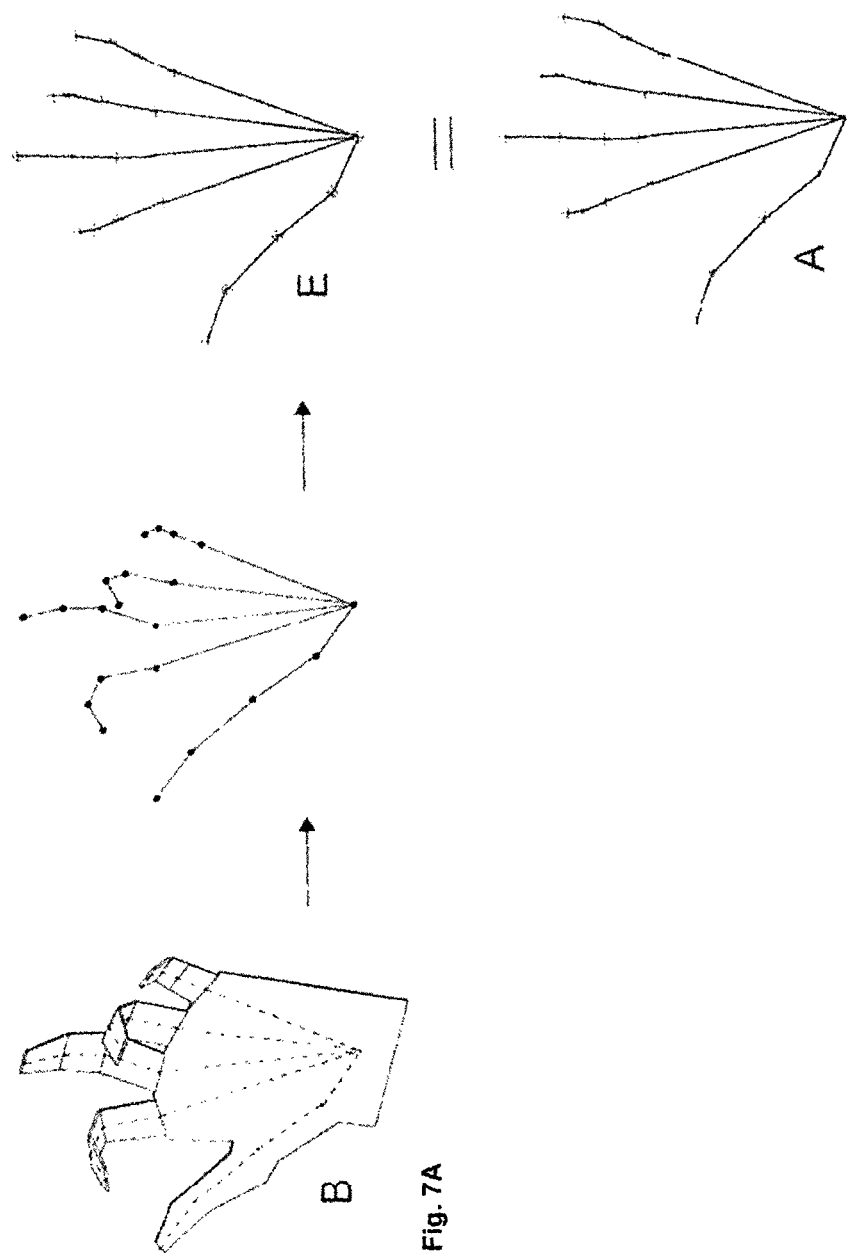
Figure 7C:
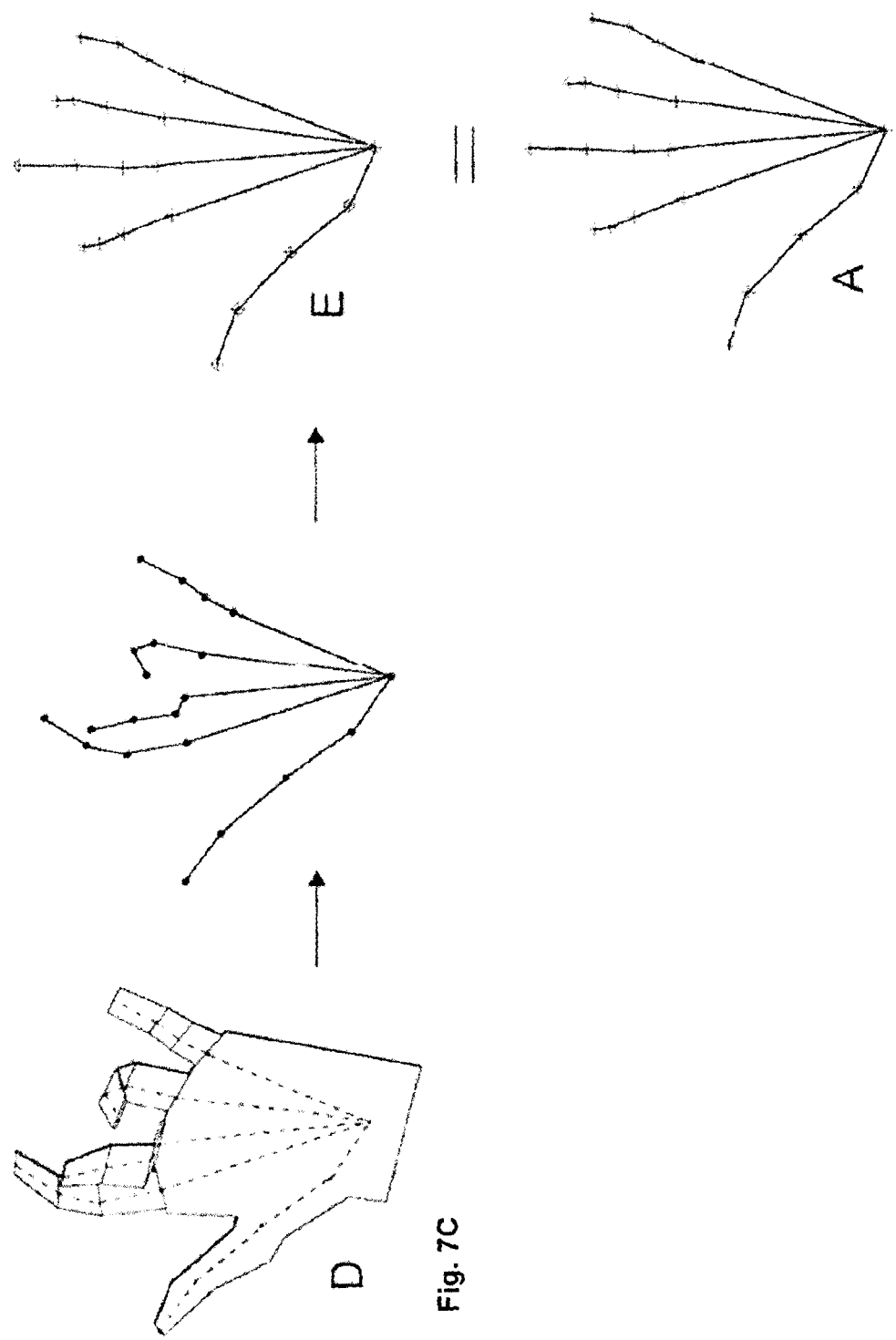

According to some embodiments of the present invention, the image processing logic may locate the 3D skeleton in a spatial position in which its 2D projection is substantially similar to the 2D image skeleton. FIGS. 7A through 7C all show an exemplary 2D image skeleton A, and several different poses B, C and D of the 3D skeleton. The two dimensional projection E of the 3D skeleton poses (B, C, D) may be substantially similar to the 2D skeleton A.

The fingers of a human hand can bend in all of its three joints in just one direction, towards the inner side of the palm. The fingers can not bend sideways in the two joints close to the finger tips, and the sideways movement at the joint connecting the finger to the palm is limited. Also, the fingers cannot bend backwards in all of its three joints. The fingers cannot swivel around any of its joints. Each phalanx may have a certain degree in which it can bend in each spatial direction relative to the phalanx closer to the wrist it is connected to. According to some embodiments of the present invention, the joint attributes may include joint anatomic constraints. According to some embodiments of the present invention, the joint anatomic constraints may include a set of angles in each spatial direction in which the bone can bend relative to the bone closer to the palm it is connected to on that joint. According to some embodiments of the present invention, the set of angles may depend on the angles in the other joints which are closer to the palm and on the bones' lengths.

According to some embodiments of the present invention, the image processing logic may apply the joint constraints to the joints of the 3D skeleton. According to some embodiments of the present invention, there may be a 3D skeleton in a 3D spatial pose and location which may substantially meet the constraints. The spatial location of the 3D skeleton which has its 2D projected skeleton substantially match the 2D image skeleton may also determine the relative distance of the hand from the camera.

Figure 8A:
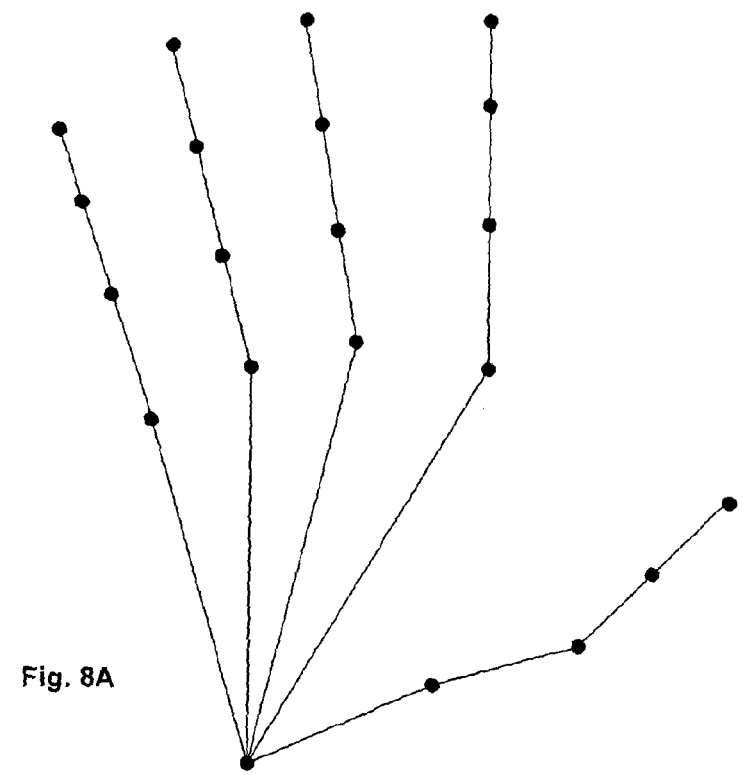
FIGS. 8A through 8B show two projections of a 3D skeleton that may be substantially similar to two 2D image skeletons of a hand located at two different distances from a capturing camera, in accordance with some embodiments of the present invention.
Figure 8B:
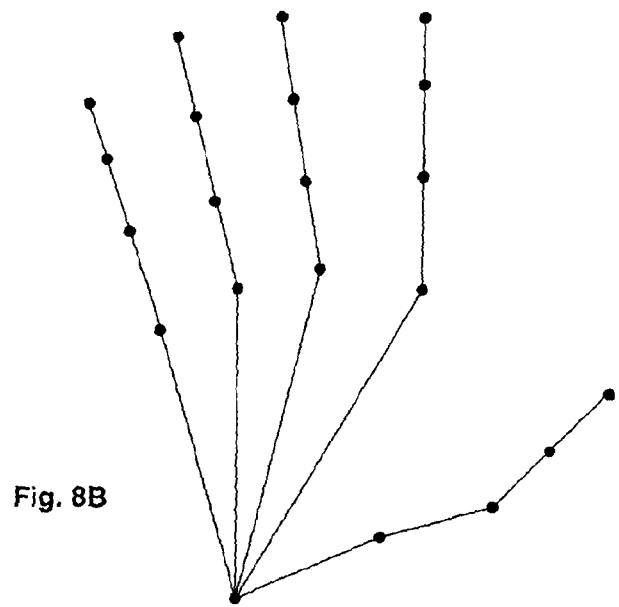

FIG. 8A through 8B show two different 2D projected images of the 3D skeleton shown in FIG. 4. The skeleton of FIG. 8A is a projected image of the skeleton of FIG. 4 closer to the camera, and the skeleton of FIG. 8B is a projected image of the skeleton of FIG. 4 further away from the camera.

The camera may capture a series of images of the gesturing interfacing hand. Each image may differ from the preceding image by an amount that depends upon the rate by which the images are being captured, upon the speed at which the hand moves, the distance of the hand from the camera, and upon the camera's resolution. Based on each captured image, the image processing logic may estimate a spatial location, orientation, distance and pose of a 3D skeleton. Each 3D skeleton may differ from the preceding 3D skeleton by an amount that depends upon the rate by which the images are being captured, the speed at which the hand moves, the hand's distance from the camera, and the camera resolution.

Two or more previous 3D skeletons derived from two or more previous images may be used to calculate and predict the current 3D skeleton based on motion dynamics physics rules. According to some embodiments of the present invention, the image processing logic may predict the current 3D skeleton based on two or more previous 3D skeletons, using motion dynamics physics rules. According to some embodiments of the present invention, a predicted 3D skeleton may be spatially posed and located in a way that may substantially meet the constraints.

According to some embodiments of the present invention, the current 3D skeleton may be predicted. The predicted current 3D skeleton may be spatially repositioned to create a skeleton which skeleton's 2D projection may be substantially similar to the 2D image skeleton and which meets the constraints. According to some embodiments of the present invention, the image processing logic may use two or more previous 3D skeletons to predict the current 3D skeleton based on motion dynamics physics rules. According to some embodiments of the present invention, the predicted 3D skeleton may be minimally reposed in a way that meets the constraints to create a 3D skeleton having a 2D projection substantially similar to the 2D image skeleton.

The data quality of elements of the 2D image skeleton extracted from the hand image may be determined. For instance: Elements that were partially hidden behind other elements may have a lower quality score than elements that were fully visible to the camera. Elements that were poorly identified will have a lower quality score than elements that were clearly identified. An element pointing towards the camera may have a lower quality score than an element facing the camera. Each bone in the vector describing the 3D skeleton may have several attributes associated with it, such as, length; and a quality score attribute which may determine the data quality of the bone's length value. The 3D skeleton's bones' lengths may be determined from the lengths of the corresponding bones in the 2D image skeleton. The 3D skeleton's bones lengths quality may be determined from the lengths accuracy of the 2D image skeleton corresponding bones.

According to some embodiments of the present invention, the interfacing hand may move and do gestures. The camera may capture images of the interfacing hand in different orientations and poses which may cause the data quality of a 3D skeleton bones' lengths to improve over time, for instance, if the same bone's length is determined from several orientations of the interfacing hand, the quality score of that bone may increase. If there are discrepancies in bone lengths between the 2D projection of the 3D skeleton that matches the constraints, and the 2D skeleton extracted from the image of the interfacing hand (the 2D image skeleton), and/or if there are bones of the 3D skeleton that may have lower quality than bones of the 2D skeleton extracted from the image (the 2D image skeleton), the bone lengths' and/or quality of the 3D skeleton having a lower quality may be updated according to the lengths and/or quality values of the corresponding bones of the 2D image skeleton having a higher quality score.

Figure 9A:
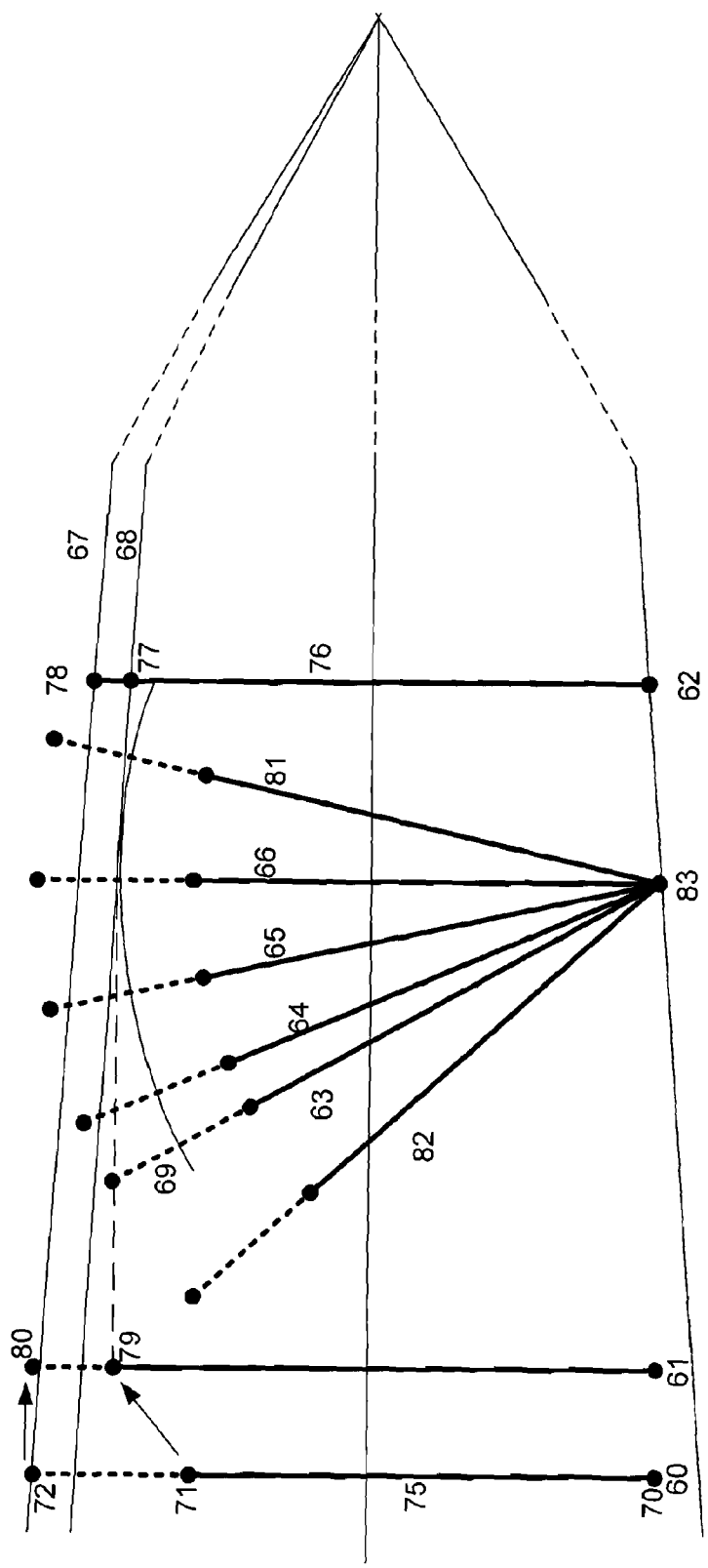
FIGS. 9A through 9B are examples showing methods and mechanisms by which a 3D skeleton bone length and quality may be updated, in accordance with some embodiments of the present invention.

FIG. 9A shows an example of a 3D bone length quality improvement. In the example of FIG. 9A bone 75 may be a 3D skeleton bone having an uncertain length. Bone 75 may start at joint 70 and end at an uncertain length somewhere between joint 71 to joint 72. Bone 76 may be the corresponding bone to bone 75 in the 2D image skeleton. Bone 76 may have an uncertain length, it may start at joint 62 and end somewhere between joint 77 to joint 78. Bone 75 may be positioned in multiple spatial orientations, the 2D projection of all of which may match the corresponding bone of the 2D image skeleton. In FIG. 9A bone 75 is shown to have orientations 63, 64, 65, 66 and 81. The two dimensional projections of bone 75 in all the above orientations may be within the boundaries of bone 76. Orientation 82 and 63 of bone 75 may not be valid orientations since the two dimensional projection may be shorter than bone 76. As can be seen from FIG. 9A, in all valid orientations of bone 75 (63, 64, 65, 66, 81), bone 75 may need to be longer than the length from joint 83 to the arc 69 in order to be within the uncertainty window boundaries of bone 76 between lines 67 and 68. The part below arc 69 may never fall within the uncertainty boundaries of bone 76. Therefore, the lower boundary of bone 75 length uncertainty may be improved and updated, and joint 71 may be converted to be 79. In orientations 63 and 64 of bone 75, the full length of the bone falls within the uncertainty boundaries, therefore joint 72 may not be improved and may remain as joint 80. The result may be that the uncertainty level of bone 75 length may be reduced from the distance between joints 71 and 72 to the shorter distance between joints 79 and 80.

Figure 9B:
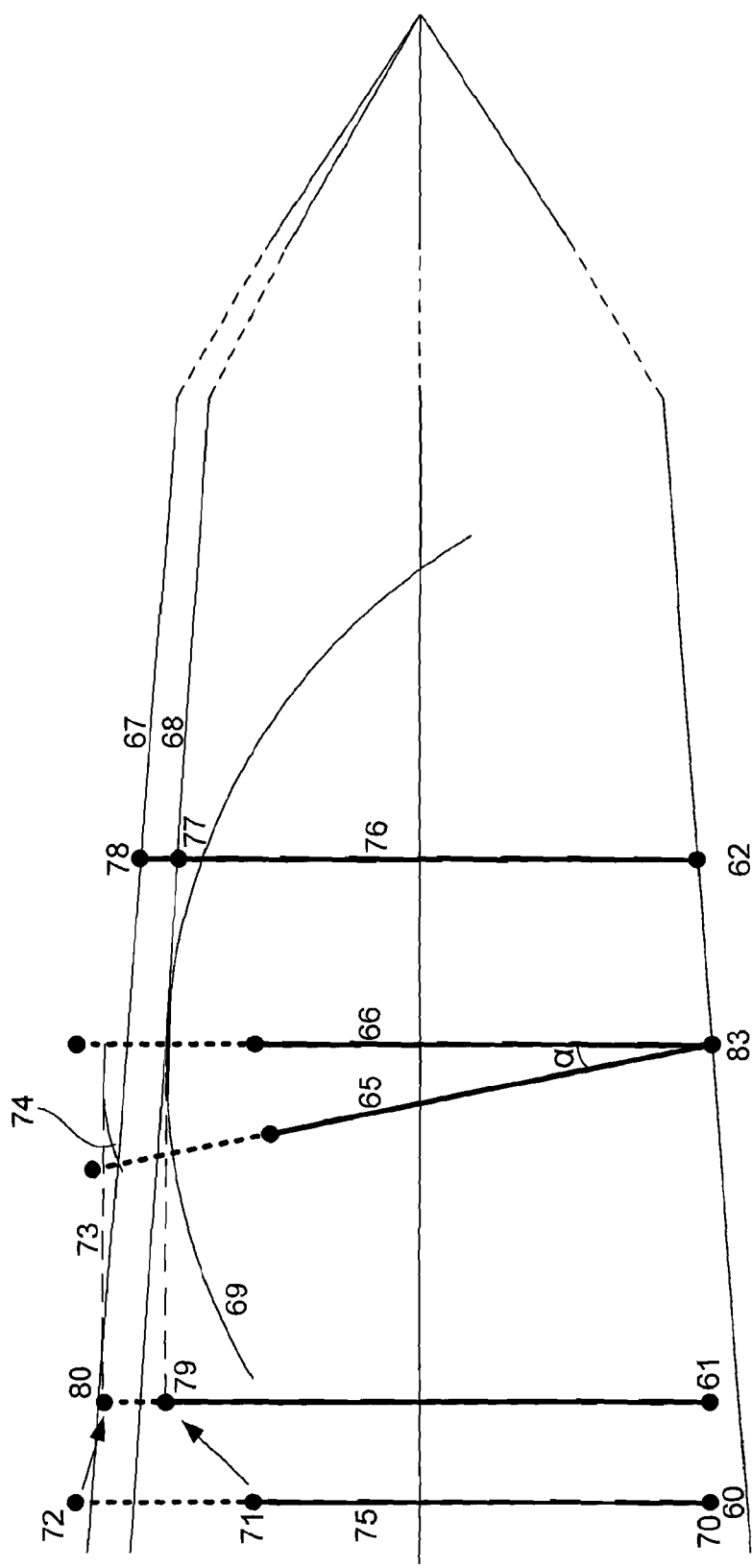

Another example is shown in FIG. 9B, in this example, bone 75 of a 3D skeleton may have an uncertain length starting at joint 70 and ending at an uncertain location between joints 71 and 72. Bone 76 may be the corresponding bone in the image skeleton, to bone 75. Bone 76 may have an uncertain length, it may start at joint 62 and end somewhere between joint 77 to joint 78. Bone 75 may have constraints that may limit its spatial orientation relative to the rest of the skeleton (not shown in the figure). In the example shown in FIG. 9B, bone 75 may be positioned in multiple orientations in between orientation 65 and orientation 66. As can be seen in the figure, the part of the bone between arc 69 and arc 74 may fall within the uncertainty boundaries of bone 76 between lines 67 and 68. The part of the bone between joint 83 and arc 69, and the part of the bone above arc 69 are out of bone 76 uncertainty boundaries. Therefore, the uncertainty length of bone 75 may be reduced, joint 71 may be converted to 79, and joint 72 may be converted to 80. The result may be that the uncertainty level of bone 75 length may be reduced from the distance between joints 71 and 72 to the shorter distance between joints 79 and 80.

As the hand moves in front of the camera doing gestures, the camera may acquire images of the hand in different orientations and poses. According to some embodiments of the present invention, the image processing logic may update and may improve the quality of a bone length.

Since the lengths of the bones of a person's hand are proportional to one another, a hand can not have for example, an Index finger longer than the Middle finger, the 3D skeleton bones' lengths may be constrained to be within the limits of certain proportions from one another. Therefore, if for instance, the bones of the 3D skeleton corresponding to the middle finger have a length attribute and high quality score (low uncertainty), and the bones of the 3D skeleton corresponding to the index finger have a length attribute and low quality score (high uncertainty), such that it is possible that the bones corresponding to the index finger may be longer than the bones corresponding to the middle finger, the quality attribute of the bones corresponding to the index finger may be improved and the uncertainty may be reduced to a level where bones corresponding to the index finger are not longer than the bones corresponding to the middle finger.

According to some embodiments of the present invention, the image processing logic may update and improve the quality attributes of a 3D skeleton bone based on the quality of another bone of the 3D skeleton and at least one constraint defining the relationship between the two bones.

Figure 10:
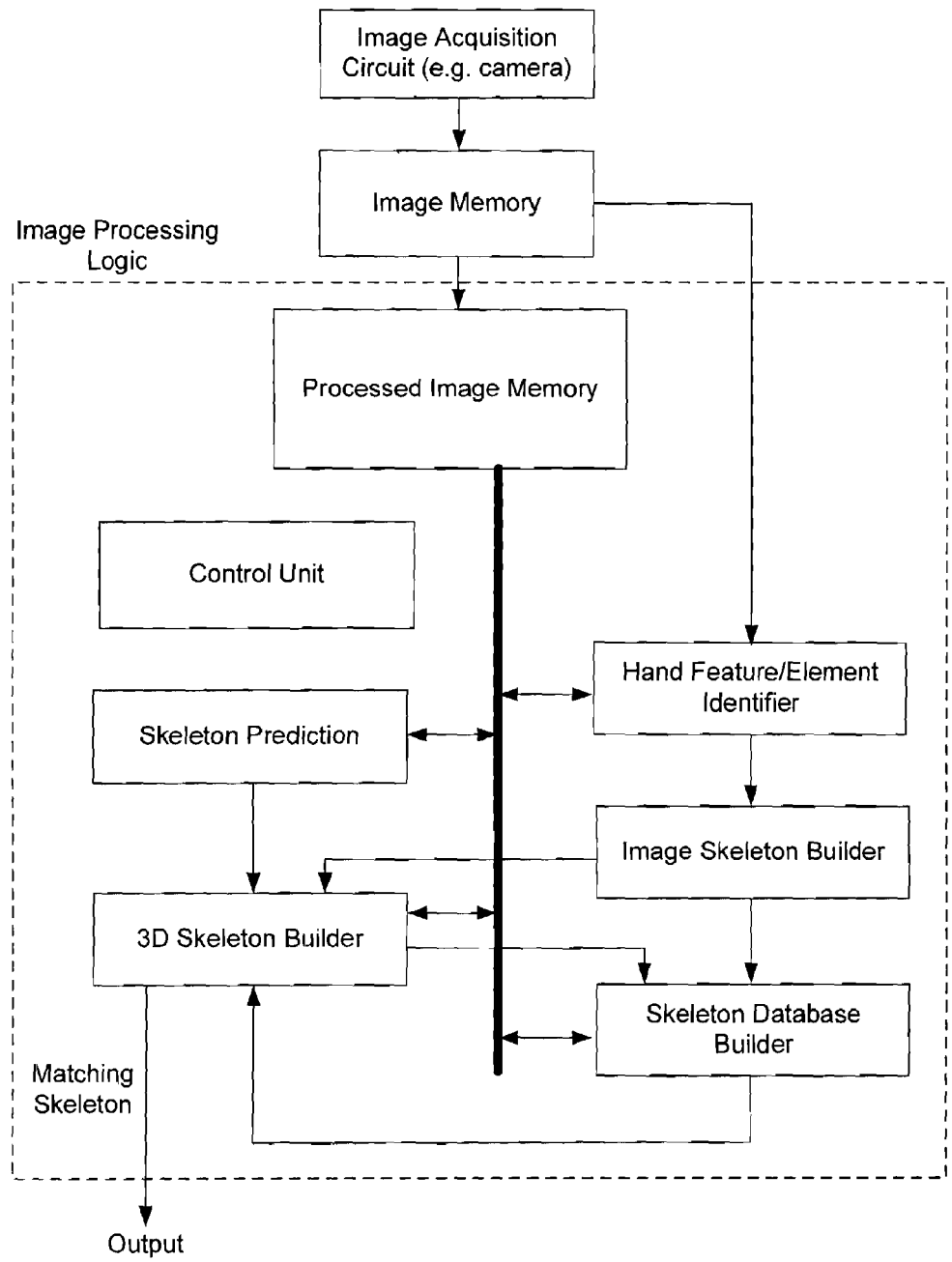
FIG. 10 is a functional block diagram of an exemplary processing unit including processing modules adapted to identify a gesture of a hand based on one or more acquired images of the hand, in accordance with some embodiments of the present invention.

FIG. 10 is an exemplary block diagram of a system in accordance with some embodiments of the present invention. The Image Acquisition Circuit (e.g. camera) may acquire a 2D image of a 3D hand interfacing with a machine. The captured image may be stored in an Image Memory.

According to some embodiments of the present invention, an Image Processing Logic/Circuit may comprise some or all of the following modules: a Control Unit, a Hand Feature/Element Identifier module, an Image Skeleton Builder module, a 3D Skeleton Builder module, a Skeleton Database Builder module, a Skeleton Prediction module, a Processed Image Memory module The Hand Feature/Element Identifier module may receive the hand image, and may identify elements or features of the hand such as finger tips, wrinkles of the finger joints, finger borders, angles between finger phalanges, etc. The Image Skeleton Builder module may receive the data of the hand elements from the hand element identifier module and create a 2D image skeleton of the hand. The Image Skeleton Builder may interpolate and/or extrapolate visible elements and/or use anatomic relationships between hand elements to fill in missing elements. The Image Skeleton Builder may also determine the quality and/or uncertainty of the image skeleton elements it created.

The 3D Skeleton Builder module may receive skeleton bone measurements and attributes from the Image Skeleton Builder module, may also receive previous 3D skeletons stored in memory, and/or may also receive predicted 3D skeleton from the Skeleton Prediction module and may also receive the 2D image skeleton from the Image Skeleton Builder module. Based on one or more of these inputs, the 3D Skeleton Builder Module may create multiple 3D skeletons, out of which, a specific skeleton may be selected.

The Skeleton Database Builder module may receive the matching skeleton information from the 3D Skeleton Builder module; information may include, but is not limited to, skeleton bone measurements and/or skeleton orientation. The Skeleton Database Builder may also receive information from the Image Skeleton Builder regarding skeleton bone measurements, skeleton orientation, skeleton bone measurements quality and uncertainty. The skeleton Database builder may then create and/or update and/or improve the lengths and/or the lengths' quality attributes of one or more bones of the 3D skeleton.

The Skeleton Prediction module may receive previous 3D skeletons stored in memory and based on motion dynamics physics rules may predict the next 3D skeleton location and/or pose. The 3D Skeleton Builder module may use the predicted skeleton to build a new 3D skeleton.

The Processed Image Memory module may store the captured image, a 3D skeleton, an image skeleton, one or more previous 3D skeletons, a predicted skeleton, a projected skeleton, attributes of the different skeletons, anatomic constrains and any other information that requires storage.

Figure 11:
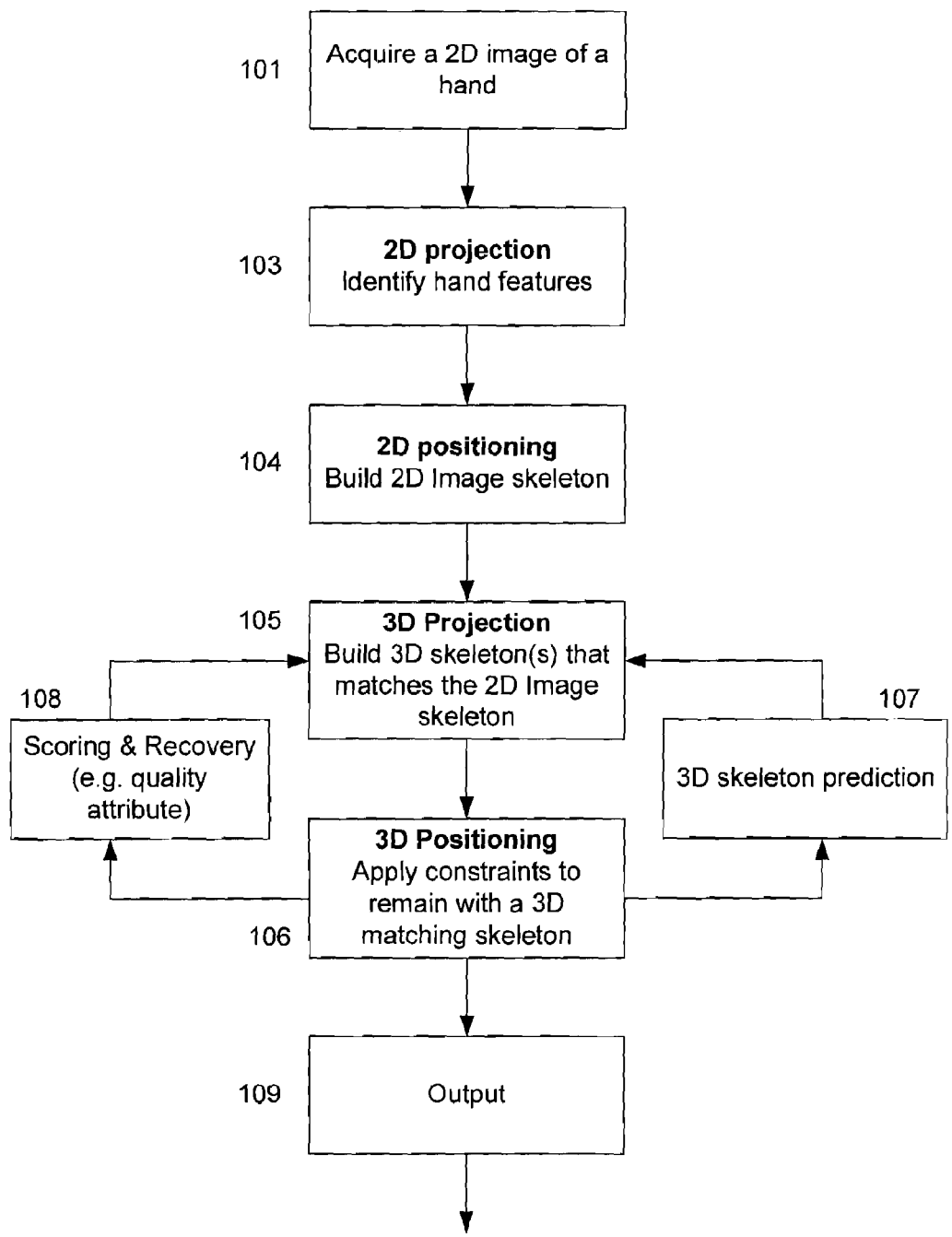
FIG. 11 is a flowchart including steps of an exemplary method by which an image processing unit may operate, in accordance with some embodiments of the present invention.

FIG. 11 is an exemplary schematic flow chart describing the method of several embodiments according to the present invention. In step 101 an image of an interfacing hand may be captured by an Image Acquisition Circuit (e.g. camera). The camera may acquire images at a certain rate of images per second. The captured one or more images may be stored in memory for further processing. In step 103 features of the hand such as fingertips and/or creases in the fingers and palm, may be identified. In step 104 a 2D image skeleton of the interfacing hand may be created based on the identified hand features. For instance, finger creases may be used to estimate the location of the finger joints. In step 105 a 3D skeleton may be posed in a way that a 2D projection of it may be substantially similar to the image skeleton created in step 104. In step 106 each candidate skeleton created in step 105 may be checked against a set of constraints, such as permitted angles between finger phalanges. The skeleton that meets the constraints may be the selected skeleton that is in a substantially similar pose to the interfacing hand—the matching skeleton. In step 107 at least one previous skeleton may be used in order to predict the current matching skeleton based on motion dynamics physics rules. In this step the previous 3D motion of the skeleton is analyzed in order to extrapolate the current skeleton position. The predicted skeleton may be used in step 105 to build a candidate skeleton. In step 108 any ambiguities, discrepancies, uncertainties may be resolved based on input information gathered from the different skeletons. In this step the bones lengths' qualities may be improved. In step 109 the information about the matching skeleton's position and/or motion may be analyzed in order to output a command signal to the machine the hand is interfacing with.

While certain features of the invention have been illustrated and described herein, many modifications, substitu- What claimed is:

1. A system for human to machine interfacing using one or more three dimensional (3D) hand skeleton models, said system comprising:
receiving circuitry adapted to receive a two dimensional (2D) image including a hand;
a hand feature identifier module comprising processing circuitry adapted to identify hand features in the received image, wherein identifying hand features includes identifying skin wrinkles indicative of locations of joints of the hand;
an image skeleton builder module comprising processing circuitry adapted to generate a 2D skeleton dataset of the hand using the identified features; and
a 3D skeleton builder module comprising processing circuitry adapted to generate a 3D hand skeleton dataset of the hand by determining a configuration of a 3D hand skeleton model matching the generated 2D skeleton dataset, by comparing 2D projections of configurations of the 3D hand skeleton model to the generated 2D skeleton dataset to determine the matching combination;
wherein said 3D skeleton builder module selects configurations of the 3D model to compare with the 2D skeleton dataset based upon a first set of locations of joints of the 2D skeleton dataset, which first set of locations of joints has been determined based on the identified skin wrinkles.

2. The system according to claim 1, wherein the 3D hand skeleton model includes anatomic relationships and constraints between elements of the 3D hand skeleton model, which constraints and relationships are factored when selecting configurations of the 3D model to compare with the 2D skeleton dataset.

3. The system according to claim 1, wherein the image skeleton builder module is further adapted to determine a quality attribute for one or more elements of the 2D skeleton dataset.

4. The system according to claim 1, further comprising a skeleton database builder module adapted to store one or more generated 3D hand skeleton datasets; and
wherein the 3D skeleton builder module is further adapted to generate the 3D hand skeleton dataset at least partially based on one or more 3D hand skeleton datasets previously stored by said database builder module.

5. The system according to claim 1, further comprising a prediction module adapted to predict a predicted 3D hand skeleton dataset based on two or more preceding 3D hand skeleton datasets to which motion dynamics physics rules are applied; and
wherein said 3D skeleton builder is further adapted to generate the 3D hand skeleton dataset at least partially based on the predicted 3D hand skeleton dataset.

6. A method for human to machine interfacing using one or more three dimensional (3D) hand skeleton models comprising:
receiving, by processing circuitry, a two dimensional (2D) image including a hand;
identifying, by processing circuitry, one or more hand features in the received image, wherein identifying hand features includes identifying skin wrinkles indicative of locations of joints of the hand;
generating, by processing circuitry, a 2D skeleton dataset of the hand using the identified features; and
generating, by processing circuitry, a 3D hand skeleton dataset of the hand by determining a configuration of a 3D hand skeleton model matching the generated 2D skeleton dataset, by comparing 2D projections of configurations of the 3D hand skeleton model to the generated 2D skeleton dataset to determine the matching combination;
wherein selecting configurations of the 3D model to compare with the 2D skeleton dataset is based upon a first set of locations of joints of the 2D skeleton dataset, which first set of locations of joints has been determined based on the identified skin wrinkles.

7. The method according to claim 6, wherein the 3D hand skeleton model includes anatomic relationships and constraints between elements of the 3D hand skeleton model, which constraints and relationships are factored when selecting configurations of the 3D model to compare with the 2D skeleton dataset.

8. The method according to claim 6, wherein generating a 2D skeleton dataset further comprises determining a quality attribute for one or more elements of the 2D skeleton dataset.

9. The method according to claim 6, further comprising storing one or more 3D hand skeleton datasets, and generating the 3D hand skeleton dataset at least partially based on the previously stored 3D hand skeleton datasets.

10. The method according to claim 6, wherein generating a 3D hand skeleton dataset further comprises predicting a predicted 3D hand skeleton dataset by applying motion dynamics physics rules to two or more previously generated 3D hand skeleton datasets, and generating the 3D hand skeleton dataset at least partially based on the predicted 3D hand skeleton dataset.

11. A system for generating a three dimensional (3D) hand skeleton dataset by using one or more 3D hand skeleton models, said system comprising:
a hand feature identifier module comprising processing circuitry adapted to identify hand features in a two dimensional (2D) image including a hand, wherein identifying features includes extrapolating tangents to segments of the hand and identifying intersections of the tangents as locations of joints of the hand;
an image skeleton builder module comprising processing circuitry adapted to generate a 2D skeleton dataset of the hand using the identified features; and
a 3D skeleton builder comprising processing circuitry adapted to determine a configuration of one of the one or more 3D hand skeleton models matching the generated 2D skeleton dataset by comparing 2D projections of configurations of the 3D hand skeleton model to the generated 2D skeleton dataset to determine the matching combination;
wherein said 3D skeleton builder module selects configurations of the 3D model to compare with the 2D skeleton dataset based upon a first set of locations of joints of the 2D skeleton dataset, which first set of locations of joints has been determined based on the identified intersections.

12. The system according to claim 11, wherein the 3D hand skeleton model includes anatomic relationships and constraints between elements of the 3D hand skeleton model, which constraints and relationships are factored when selecting configurations of the 3D model to compare with the 2D skeleton dataset.

13. The system according to claim 11, wherein the image skeleton builder module is further adapted to determine a quality attribute for one or more elements of the 2D skeleton dataset.

14. The system according to claim 11, further comprising a skeleton database builder module adapted to store one or more generated 3D hand skeleton datasets; and wherein the 3D skeleton builder module is further adapted to generate the 3D hand skeleton dataset at least partially based on one or more 3D hand skeleton datasets previously stored by said database builder module.

15. The system according to claim 11, further comprising a prediction module adapted to predict a predicted 3D hand skeleton dataset based on two or more preceding 3D hand skeleton datasets to which motion dynamics physics rules are applied; and wherein said 3D skeleton builder is further adapted to generate the 3D hand skeleton dataset at least partially based on the predicted 3D hand skeleton dataset.

\* \* \* \* \*